(12) United States Patent
Dubrosky et al.

(10) Patent No.: US 11,563,311 B2
(45) Date of Patent: Jan. 24, 2023

(54) DEVICE INSERTION AND REMOVAL METHOD FOR ELECTRICAL EQUIPMENT

(71) Applicant: ABB Schweiz AG, Baden (CH)

(72) Inventors: Justin Dubrosky, Plainville, CT (US); Louis K. McLinden, III, Plainville, CT (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/358,989

(22) Filed: Jun. 25, 2021

(65) Prior Publication Data

US 2022/0416519 A1 Dec. 29, 2022

(51) Int. Cl.
*H02B 1/052* (2006.01)
*H02B 1/056* (2006.01)
*H02B 1/04* (2006.01)

(52) U.S. Cl.
CPC ............ *H02B 1/0523* (2013.01); *H02B 1/04* (2013.01); *H02B 1/0565* (2013.01)

(58) Field of Classification Search
CPC ...................... H02B 1/015; H02B 1/056–0565
See application file for complete search history.

(56) References Cited

U.S. PATENT DOCUMENTS

| 6,292,076 B1* | 9/2001 | DeGrazia | H02B 1/052 361/807 |
| 7,679,887 B2* | 3/2010 | Adunka | H02B 1/0565 361/647 |
| 10,790,641 B1* | 9/2020 | Yao | H05K 7/183 |

FOREIGN PATENT DOCUMENTS

| CN | 112448273 A | * | 3/2021 | ............ H02B 1/042 |
| DE | 3712824 A1 | * | 11/1988 | ............ H02B 1/04 |
| DE | 10012764 A1 | * | 9/2001 | ............ H02B 1/052 |
| EP | 0327708 A2 | * | 8/1989 | ............ H02B 1/052 |
| FR | 2388154 A1 | * | 11/1978 | ............ H02B 1/052 |

* cited by examiner

*Primary Examiner* — Robert J Hoffberg
(74) *Attorney, Agent, or Firm* — Greenberg Traurig, LLP (57) ABSTRACT

An assembly includes a mounting bracket; a member; a guide disposed in the member; and a slider, the slider configured to move between a first position and a second position relative to the member, the slider being configured to move within the guide. The slider has a first end and a second end, the first end opposite the second end. The first end includes a first portion and a second portion, the first portion configured to provide a contact for application of a force in a first direction and the second portion configured to provide a contact for application of a force in a second direction. The second direction is opposite the first direction.

19 Claims, 5 Drawing Sheets

DEVICE INSERTION AND REMOVAL METHOD FOR ELECTRICAL EQUIPMENT

FIELD

This disclosure relates generally to panelboards for power distribution. More particularly, this disclosure relates to a mounting bracket for installing or uninstalling an electrical device such as, but not limited to, a circuit breaker, a meter module, a surge protector, or the like from a panelboard.

BACKGROUND

A panelboard includes a panel or group of panel units designed for assembly in a form of a single panel that includes buses and automatic overcurrent devices, equipped with or without switches for control of light, heat, or other power circuits. The panelboard is generally placed in a cabinet or cutout box and placed in or against a wall, partition, or other support. A panelboard includes buses to which individual circuit breakers can be installed.

SUMMARY

In an embodiment, an assembly includes a mounting bracket; a member; a guide disposed in the member; and a slider, the slider configured to move between a first position and a second position relative to the member, the slider being configured to move within the guide. In an embodiment, the slider has a first end and a second end, the first end opposite the second end. In an embodiment, the first end includes a first portion and a second portion, the first portion configured to provide a contact for application of a force in a first direction and the second portion configured to provide a contact for application of a force in a second direction. In an embodiment, the second direction is opposite the first direction. In an embodiment, the slider has a first width between the first end and the second end. In an embodiment, the slider has a second width at the first end and the second end. In an embodiment, the first width is smaller than the second width.

In an embodiment, the assembly includes an aperture at the second end of the slider.

In an embodiment, the mounting bracket is made of plastic, metal, or any combination thereof.

In an embodiment, the member includes a first portion and a second portion, the first portion including the guide and configured to receive an electrical device, the second portion including a rail connector.

In an embodiment, the first portion and the second portion are connected by a third portion.

In an embodiment, the third portion is perpendicular to the first portion and the third portion is perpendicular to the second portion.

In an embodiment, the first portion includes a planar surface and the second portion includes a planar surface, wherein the planar surface of the first portion is parallel to the planar surface of the second portion.

In an embodiment, the slider includes a plurality of posts, the plurality of posts configured to contact a surface of the second portion and configured to support the slider on the surface of the second portion.

In an embodiment, the slider includes a plurality of posts, and wherein the second portion comprises a plurality of openings, a portion of the plurality of posts extending through the plurality of openings, and wherein an end of the plurality of posts is larger than the plurality of openings.

In an embodiment, the plurality of posts are a plurality of fasteners configured to removably secure the slider to the member.

In an embodiment, the slider is removable.

In an embodiment, an assembly includes a mounting bracket and an electrical device secured to the mounting bracket. In an embodiment, the mounting bracket includes a member; a guide disposed in the member; and a slider, the slider configured to move between a first position and a second position relative to the member, the slider being configured to move within the guide. In an embodiment, the slider has a first end and a second end, the first end opposite the second end. In an embodiment, the first end includes a first portion and a second portion, the first portion configured to provide a contact for application of a force in a first direction and the second portion configured to provide a contact for application of a force in a second direction. In an embodiment, the second direction is opposite the first direction. In an embodiment, the slider has a first width between the first end and the second end. In an embodiment, the slider has a second width at the first end and the second end. In an embodiment, the first width is smaller than the second width.

In an embodiment, the assembly includes an aperture at the second end of the slider.

In an embodiment, the mounting bracket is made of plastic, metal, or any combination thereof.

In an embodiment, the member includes a first portion and a second portion, the first portion including the guide and configured to receive an electrical device, the second portion including a rail connector.

In an embodiment, the first portion and the second portion are connected by a third portion.

In an embodiment, the third portion is perpendicular to the first portion and the third portion is perpendicular to the second portion.

In an embodiment, the first portion includes a planar surface and the second portion includes a planar surface, wherein the planar surface of the first portion is parallel to the planar surface of the second portion.

In an embodiment, the slider includes a plurality of posts, the plurality of posts configured to contact a surface of the second portion and configured to support the slider on the surface of the second portion.

In an embodiment, the slider includes a plurality of posts, and wherein the second portion comprises a plurality of openings, a portion of the plurality of posts extending through the plurality of openings, and wherein an end of the plurality of posts is larger than the plurality of openings.

In an embodiment, the plurality of posts are a plurality of fasteners configured to removably secure the slider to the member.

In an embodiment, the slider is removable.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Generally, installing or removing a device (e.g., a circuit breaker or the like) utilizing a sliding connection to interface with a bus bar (e.g., in a panelboard) can be achieved in a few ways. First, the device can be manually pushed into the bus. Typically, this can require a substantial amount of force to properly connect the device to the bus bar. Alternatively, a tool can be used to mechanically leverage the device into the bus using a fixed point on the device. This may aid with reducing an amount of force for installing the device to the bus bar, but generally is not helpful in removing the device from the bus bar because a fixed point does not allow for optimal force in both directions. The fixed point can be either optimal for insertion or optimal for removal. Embodiments of this disclosure are directed to a mounting bracket for a device (e.g., a circuit breaker or the like) that can simplify an installation of the device to, for example, a bus bar. In an embodiment, the mounting bracket can include a movable member (e.g., a slider or the like) that can be moved between multiple positions (e.g., an installation position and an uninstallation position). In an embodiment, the multiple positions can enable a more optimal use of force when installing the device to the bus bar and a more optimal use of force when uninstalling the device from the bus bar. In an embodiment, the movable member can be fixed to the mounting bracket. In an embodiment, the movable member can be removably fixed to the mounting bracket.

Advantageously, embodiments of this disclosure can reduce an amount of effort in installing or uninstalling a device from an interface with a bus bar. Additionally, embodiments of this disclosure can advantageously reduce an amount of time to install or uninstall a device from an interface with a bus bar.

Figure 1:
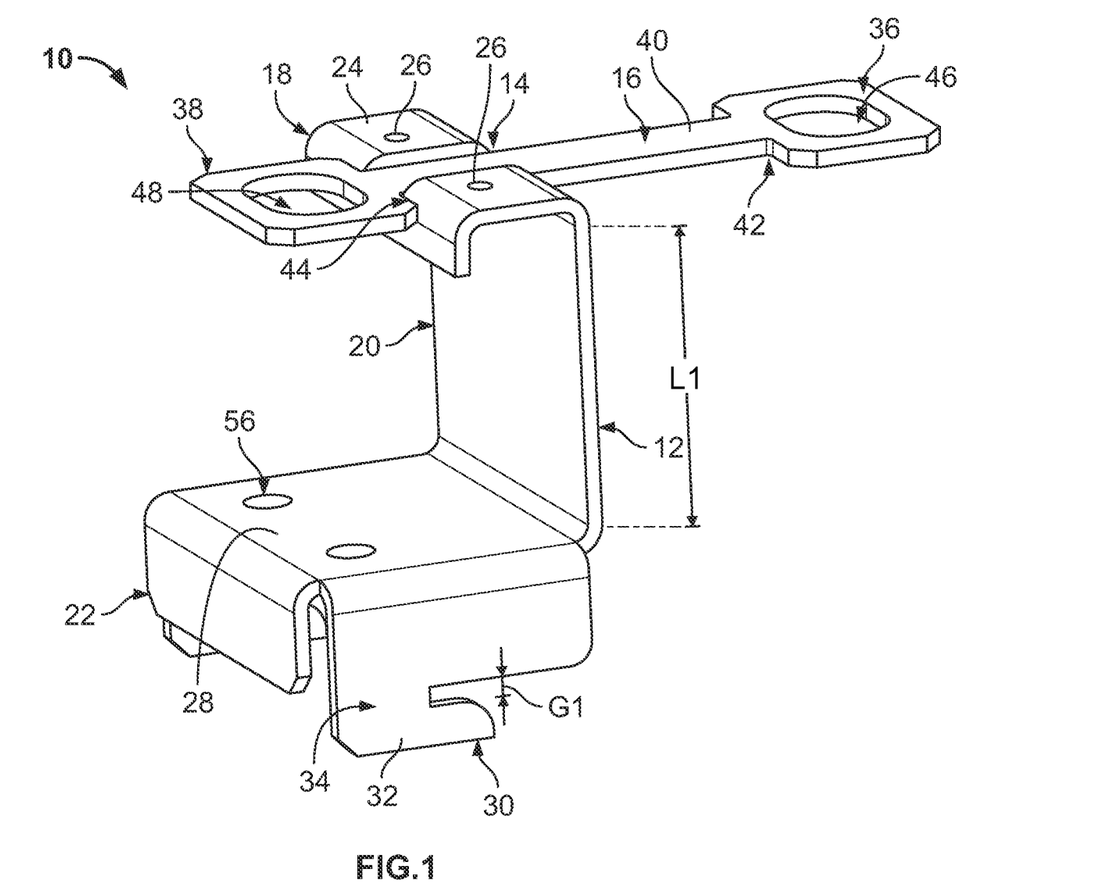
FIG. 1 shows a mounting bracket, according to an embodiment.

FIG. 1 shows a mounting bracket 10, according to an embodiment. The mounting bracket 10 includes a member 12 having a guide 14 in which a slider 16 is disposed. The mounting bracket 10 can receive an electrical device such as, but not limited to, a circuit breaker, a meter module, a surge protector, or the like.

The member 12 includes a first portion 18, a second portion 20, and a third portion 22.

The first portion 18 can include the guide 14. The first portion 18 can include a planar surface 24 in which the guide 14 is recessed and is configured to receive the slider 16. In an embodiment, the first portion 18 can be configured to receive an electrical device. For example, the first portion 18 can include a plurality of apertures 26 via which the electrical device can be secured to the member 12. In the illustrated embodiment, the plurality of apertures 26 includes two apertures. It is to be appreciated that the number of the plurality of apertures 26 can vary beyond the stated number according to principles of this description.

The second portion 20 is arranged perpendicularly or substantially perpendicularly to the planar surface 24 of the first portion 18. As used herein, perpendicularly or substantially perpendicularly includes variations from perpendicular such as, for example, within 10° from perpendicular. A length L1 of the second portion 20 can be selected so that, when installed, the electrical device is properly aligned for installation to a panelboard. As such, the length L1 can vary according to an application of the mounting bracket 10. The second portion 20 spaces the first portion 18 from the third portion 22.

The third portion 22 includes a planar surface 28. The planar surface 28 is configured to be in a plane that is parallel to a plane of the planar surface 28 of the first portion 18. As used herein, parallel can include variations from parallel. For example, the planes can be off parallel by up to 10°. This can, for example, be the result of manufacturing tolerances or the like. The third portion 22 can include a rail connector 30 for engaging with a rail of a panelboard. The rail connector 30 includes a plurality of members 32 spaced from the member 12 by a distance G1. The distance G1 can form a guide 34. The guide 34 is sized to engage with a frame rail of a panelboard when installing the mounting bracket 10 to the panelboard. As such, the distance G1 and the guide 34 can vary according to an application of the mounting bracket 10. The third portion 22 can include a plurality of apertures 56. The plurality of apertures 56 can be used to secure the member 12 to a rail of a panelboard when installed.

The member 12 can be made of, for example, metal, plastic, combinations thereof, or the like. In an embodiment, the member 12 can be made of sheet metal. In an embodiment, the member 12 can be a single piece of sheet metal.

The slider 16 includes a first end 36 and a second end 38. In the illustrated embodiment, the slider 16 is symmetrical. That is, the first end 36 and the second end 38 are the same. A middle portion 40 is disposed between the first end 36 and the second end 38. The middle portion 40 is configured to be slidable in the guide 14 of the member 12. The first end 36 can be configured to include shoulder 42 and the second end 38 can be configured to include shoulder 44. The shoulder 42 and the shoulder 44 are sized so that the middle portion 40 is movable along a length of the middle portion 40 from the shoulder 42 to the shoulder 44. That is, at extents of the movement of the slider 16, the shoulder 42 and the shoulder 44 abut the first portion 18 of the member 12 so that at least a portion of the shoulder 42 and the shoulder 44 contact the first portion 18 of the member 12.

In the illustrated embodiment, the first end 36 includes an aperture 46 and the second end 38 includes an aperture 48. In an embodiment, the aperture 48 may not be included. For example, the second end 38 can be a solid piece of material instead of having the aperture 46. In an embodiment, the aperture 46, the aperture 48, or both the aperture 46 and the aperture 48 need not be a complete aperture. For example, in an embodiment, the aperture 46, the aperture 48, or both the aperture 46 and the aperture 48 can be open along at least a part of the perimeter.

In an embodiment, it may be simpler to manufacture the slider 16 in the illustrated form in which the first end 36 and the second end 38 are the same to reduce assembly errors (e.g., because installation orientation of the slider 16 in the guide 14 would be irrelevant).

The first end 36 includes the aperture 46 so that a tool (e.g., a screwdriver or the like) can be inserted through the aperture 46 to install or uninstall the mounting bracket 10 from, for example, a bus bar in a panelboard. Examples of the installation and uninstallation of a mounting bracket are shown and described in additional detail in accordance with FIGS. 7 and 8 below. The slider 16 is generally disposed at a location at which the force applied is generally disposed at a location of the electrical device.

The middle portion 40 of the slider 16 can be designed so that it is removable from the guide 14. In an embodiment, the middle portion 40 of the slider 16 may be designed such that the slider 16 is capable of being snap-fit into the guide 14. In such an embodiment, the member 12 can be made of plastic. In such an embodiment, the materials of the member 12 and accordingly the guide 14 include some flexibility relative to the materials of the slider 16.

The slider 16 can be made of, for example, metal, plastic, combinations thereof, or the like. In an embodiment, the slider 16 can be made of sheet metal. In an embodiment, the material of the slider 16 can be the same as the material of the member 12. In an embodiment, the material of the slider 16 can be different than the material of the member 12.

Additional geometry of the slider 16 is discussed in additional detail in accordance with FIG. 2 below.

Figure 2:
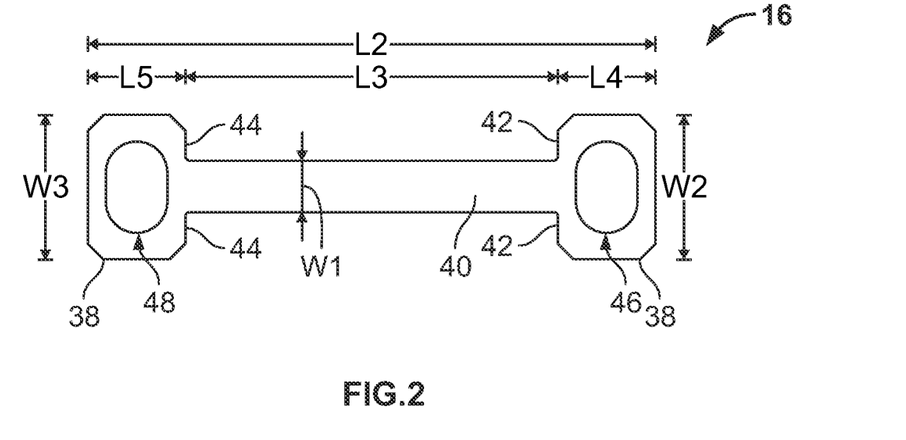
FIG. 2 shows the slider of the mounting bracket of FIG. 1, according to an embodiment.

FIG. 2 shows the slider 16 of the mounting bracket 10 of FIG. 1, according to an embodiment.

The slider 16 has a length L2. The length L2 can be broken into several component lengths L3, L4, and L5. The length L3 is the length of the middle portion 40. As such, the length L3 can also be equivalent to a length of travel of the slider 16. In the illustrated embodiment, the lengths L4 and L5 are the same. In an embodiment, the lengths L4 and L5 can be different. For example, if the first end 36 and the second end 38 of the slider 16 are not symmetrical, the first end 36 and the second end 38 can result in different lengths L4 and L5.

The slider 16 has a width W1 at the middle portion 40. The width W1 is selected so that the slider 16 is insertable into the guide 14. In an embodiment, the slider 16 can be insertable in a snap fit connection and then slidable within the guide 14. The first end 36 has a width W2 and the second end 38 has a width W3. In the illustrated embodiment, the width W2 and the width W3 are the same. It is to be appreciated that the widths W2 and W3 can be different in an embodiment. The widths W2 and W3 are larger than the width W1 so that the shoulder 42 and the shoulder 44 are created at the junction between the middle portion 40 and the first end 36 and the junction between the middle portion 40 and the second end 38.

Figure 3:
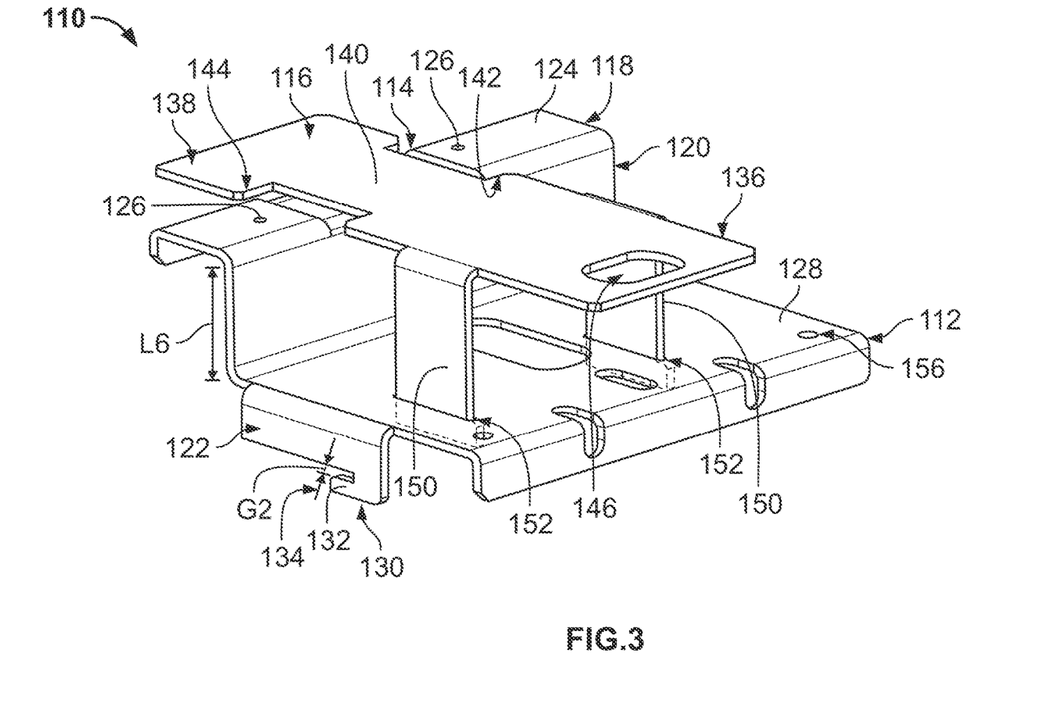
FIG. 3 shows a mounting bracket, according to an embodiment.

FIG. 3 shows a mounting bracket 110, according to another embodiment. The mounting bracket 110 includes a member 112 having a guide 114 in which a slider 116 is disposed. The mounting bracket 110 can receive an electrical device such as, but not limited to, a circuit breaker, a meter module, a surge protector, or the like. Aspects of the mounting bracket 110 can be the same as, or similar to, aspects of the mounting bracket 10 (FIG. 1).

The member 112 includes a first portion 118, a second portion 120, and a third portion 122.

The first portion 118 can include the guide 114. The first portion 118 can include a planar surface 124 in which the guide 114 is recessed and is configured to receive the slider 116. In an embodiment, the first portion 118 can be configured to receive an electrical device. For example, the first portion 118 can include a plurality of apertures 126 via which the electrical device can be secured to the member 112. In the illustrated embodiment, the plurality of apertures 126 includes two apertures. It is to be appreciated that the number of the plurality of apertures 126 can vary beyond the stated number according to principles of this description.

The second portion 120 is arranged perpendicularly or substantially perpendicularly to the planar surface 124 of the first portion 118. As used herein, perpendicularly or substantially perpendicularly includes variations from perpendicular such as, for example, within 10° from perpendicular. A length L6 of the second portion 120 can be selected so that, when installed, the electrical device is properly aligned for installation to a panelboard. As such, the length L6 can vary according to an application of the mounting bracket 110. The second portion 120 spaces the first portion 118 from the third portion 122.

The third portion 122 includes a planar surface 128. The planar surface 128 is configured to be in a plane that is parallel to a plane of the planar surface 128 of the first portion 118. As used herein, parallel can include variations from parallel. For example, the planes can be off parallel by up to 10°. This can, for example, be the result of manufacturing tolerances or the like. The third portion 122 can include a rail connector 130 for engaging with a rail of a panelboard. The rail connector 130 includes a plurality of members 132 spaced from the member 112 by a distance G2. The distance G2 can form a guide 134. The guide 134 is sized to engage with a frame rail of a panelboard when installing the mounting bracket 110 to the panelboard. As such, the distance G2 and the guide 134 can vary according to an application of the mounting bracket 110. The third portion 122 can include a plurality of apertures 156. The plurality of apertures 156 can be used to secure the member 112 to a rail of a panelboard when installed.

The member 112 can be made of, for example, metal, plastic, combinations thereof, or the like. In an embodiment, the member 112 can be made of sheet metal. In an embodiment, the member 112 can be a single piece of sheet metal.

The slider 116 includes a first end 136 and a second end 138. In the illustrated embodiment, the slider 116 is asymmetrical. That is, the first end 136 and the second end 138 are different. Additionally, the first end 136 is longer than the second end 138. A middle portion 140 is disposed between the first end 136 and the second end 138. The middle portion 140 is configured to be slidable in the guide 114 of the member 112. The first end 136 can be configured to include shoulder 142 and the second end 138 can be configured to include shoulder 144. The shoulder 142 and the shoulder 144 are sized so that the middle portion 140 is movable along a length of the middle portion 140 from the shoulder 142 to the shoulder 144. That is, at extents of the movement of the slider 116, the shoulder 142 and the shoulder 144 abut the first portion 118 of the member 112 so that at least a portion of the shoulder 142 and the shoulder 144 contact the first portion 118 of the member 112.

In the illustrated embodiment, the first end 136 includes an aperture 146 and the second end 138 does not include an aperture. It is to be appreciated that the second end 138 could also include an aperture. In an embodiment, the aperture 146 need not be a complete aperture. For example, in an embodiment, the aperture 146 can be open along at least a part of the perimeter.

The first end 136 includes the aperture 146 so that a tool (e.g., a screwdriver or the like) can be inserted through the aperture 146 to install or uninstall the mounting bracket 110 from, for example, a bus bar in a panelboard. Examples of the installation and uninstallation of a mounting bracket are shown and described in additional detail in accordance with FIGS. 7 and 8 below.

The middle portion 140 of the slider 116 may be designed such that the slider 116 is capable of being snap-fit into the guide 114. As such, the materials of the member 112 and accordingly the guide 114 include some flexibility relative to the materials of the slider 116.

The slider 116 can be made of, for example, metal, plastic, combinations thereof, or the like. In an embodiment, the slider 116 can be made of sheet metal. In an embodiment, the material of the slider 116 can be the same as the material of the member 112. In an embodiment, the material of the slider 116 can be different than the material of the member 112.

The slider 116 can include a plurality of extension members 150. The plurality of extension members 150 can be configured to be inserted into slots 152 in the third portion 122 of the mounting bracket 110. The extension members 150 can provide for increased strength of the slider 116 when, for example, using a tool to provide an installation or uninstallation force via the aperture 146 by transferring some of the force through the plurality of extension members 150 to the member 112. The slots 152 in the member 112 may be designed to allow an amount of travel equivalent to a length of the middle portion 140 of the slider 116.

Additional geometry of the slider 116 is discussed in additional detail in accordance with FIG. 4 below.

Figure 4:
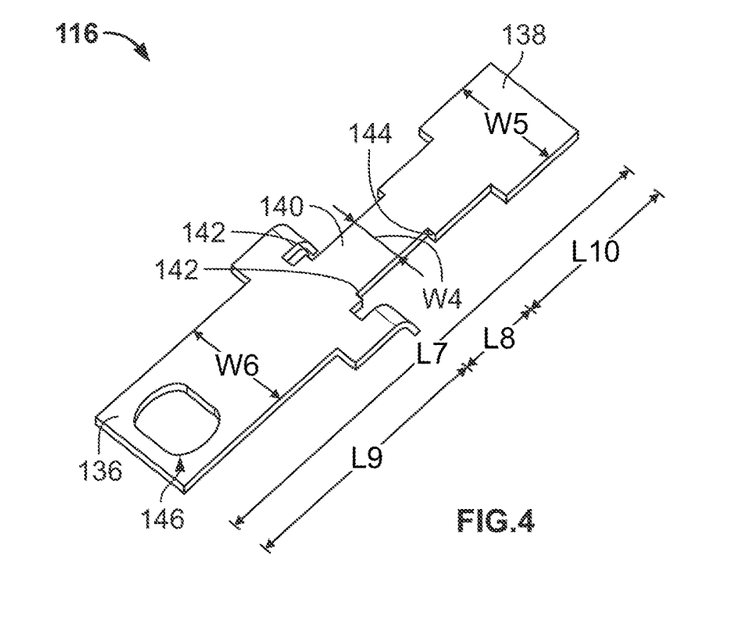
FIG. 4 shows the slider of the mounting bracket of FIG. 3, according to an embodiment.

FIG. 4 shows the slider 116 of the mounting bracket 110 of FIG. 3, according to an embodiment.

The slider 116 has a length L7. The length L7 can be broken into several component lengths L8, L9, and L10. The length L8 is the length of the middle portion 140. As such, the length L8 can also be equivalent to a length of travel of the slider 116. In the illustrated embodiment, the lengths L9 and L10 are different. In an embodiment, the lengths L9 and L10 can be the same. For example, if the first end 136 and the second end 138 of the slider 116 are symmetrical, the first end 136 and the second end 138 can result in the same lengths L9 and L10.

The slider 116 has a width W4 at the middle portion 140. The width W4 is selected so that the slider 116 is insertable into the guide 114. In an embodiment, the slider 116 can be inserted into the guide 114 in a snap fit connection and then slidable within the guide 114. It is to be appreciated that the slider 116 can be inserted into the guide 114 without being snap fit into the guide 114. In such an embodiment, the width W4 is smaller than a width of the guide 114. The first end 136 has a width W5 and the second end 138 has a width W6. In the illustrated embodiment, the width W5 and the width W6 are the same. It is to be appreciated that the widths W5 and W6 can be different in an embodiment. The widths W5 and W6 are larger than the width W4 so that the shoulder 142 and the shoulder 144 are created at the junction between the middle portion 140 and the first end 136 and the junction between the middle portion 140 and the second end 138.

Figure 5:
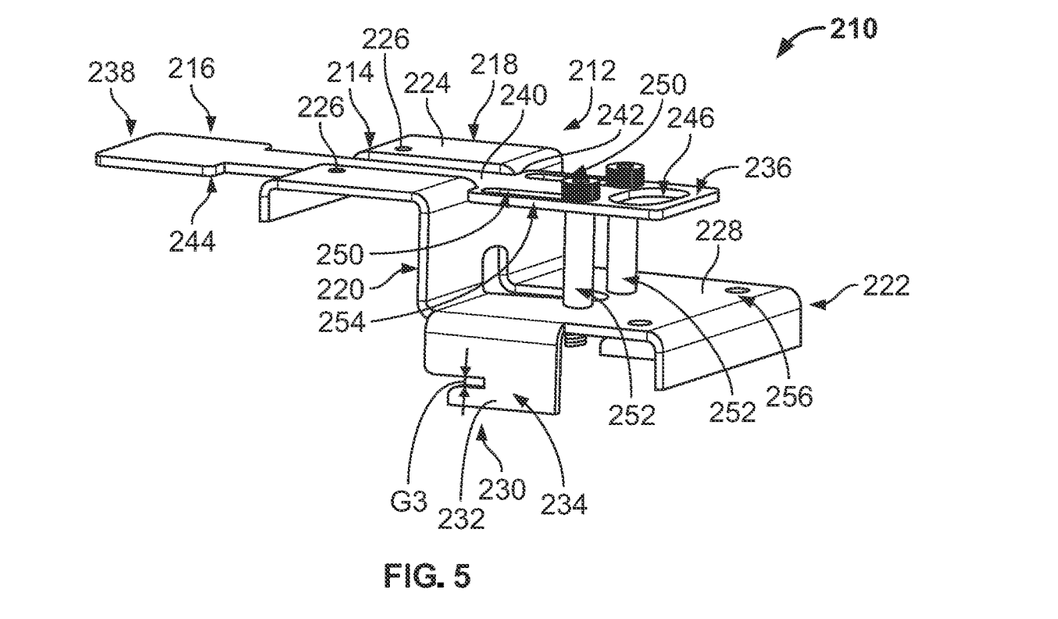
FIG. 5 shows a mounting bracket, according to an embodiment.

FIG. 5 shows a mounting bracket 210, according to an embodiment. The mounting bracket 210 includes a member 212 having a guide 214 in which a slider 216 is disposed. The mounting bracket 210 can receive an electrical device such as, but not limited to, a circuit breaker, a meter module, a surge protector, or the like. Aspects of the mounting bracket 210 can be the same as, or similar to, aspects of the mounting bracket 110 (FIG. 3) or the mounting bracket 10 (FIG. 1).

The member 212 includes a first portion 218, a second portion 220, and a third portion 222.

The first portion 218 can include the guide 214. The first portion 218 can include a planar surface 224 in which the guide 214 is recessed and is configured to receive the slider 216. In an embodiment, the first portion 218 can be configured to receive an electrical device. For example, the first portion 218 can include a plurality of apertures 226 via which the electrical device can be secured to the member 212. In the illustrated embodiment, the plurality of apertures 226 includes two apertures. It is to be appreciated that the number of the plurality of apertures 226 can vary beyond the stated number according to principles of this description.

The second portion 220 is arranged perpendicularly or substantially perpendicularly to the planar surface 224 of the first portion 218. As used herein, perpendicularly or substantially perpendicularly includes variations from perpendicular such as, for example, within 10° from perpendicular. A length L11 of the second portion 220 can be selected so that, when installed, the electrical device is properly aligned for installation to a panelboard. As such, the length L11 can vary according to an application of the mounting bracket 210. The second portion 220 spaces the first portion 218 from the third portion 222.

The third portion 222 includes a planar surface 228. The planar surface 228 is configured to be in a plane that is parallel to a plane of the planar surface 228 of the first portion 218. As used herein, parallel can include variations from parallel. For example, the planes can be off parallel by up to 10°. This can, for example, be the result of manufacturing tolerances or the like. The third portion 222 can include a rail connector 230 for engaging with a rail of a panelboard. The rail connector 230 includes a plurality of members 232 spaced from the member 212 by a distance G3. The distance G3 can form a guide 234. The guide 234 is sized to engage with a frame rail of a panelboard when installing the mounting bracket 210 to the panelboard. As such, the distance G3 and the guide 234 can vary according to an application of the mounting bracket 210. The third portion 222 can include a plurality of apertures 256. The plurality of apertures 256 can be used to secure the member 212 to a rail of a panelboard when installed.

The member 212 can be made of, for example, metal, plastic, combinations thereof, or the like. In an embodiment, the member 212 can be made of sheet metal. In an embodiment, the member 212 can be a single piece of sheet metal.

The slider 216 includes a first end 236 and a second end 238. In the illustrated embodiment, the slider 216 is asymmetrical. That is, the first end 236 and the second end 238 are different. Additionally, the first end 236 is longer than the second end 238. A middle portion 240 is disposed between the first end 236 and the second end 238. The middle portion 240 is configured to be slidable in the guide 214 of the member 212. The first end 236 can be configured to include shoulder 242 and the second end 238 can be configured to include shoulder 244. The shoulder 242 and the shoulder 244 are sized so that the middle portion 240 is movable along a length of the middle portion 240 from the shoulder 242 to the shoulder 244. That is, at extents of the movement of the slider 216, the shoulder 242 and the shoulder 244 abut the first portion 218 of the member 212 so that at least a portion of the shoulder 242 and the shoulder 244 contact the first portion 218 of the member 212.

In the illustrated embodiment, the first end 236 includes an aperture 246 and the second end 238 does not include an aperture. It is to be appreciated that the second end 238 could also include an aperture. In an embodiment, the aperture 246 need not be a complete aperture. For example, in an embodiment, the aperture 246 can be open along at least a part of the perimeter.

The first end 236 includes the aperture 246 so that a tool (e.g., a screwdriver or the like) can be inserted through the aperture 246 to install or uninstall the mounting bracket 210 from, for example, a bus bar in a panelboard. Examples of the installation and uninstallation of a mounting bracket are shown and described in additional detail in accordance with FIGS. 7 and 8 below.

The middle portion 240 of the slider 216 may be designed such that the slider 216 is capable of being snap-fit into the guide 214. As such, the materials of the member 212 and accordingly the guide 214 include some flexibility relative to the materials of the slider 216.

The slider 216 can be made of, for example, metal, plastic, combinations thereof, or the like. In an embodiment, the slider 216 can be made of sheet metal. In an embodiment, the material of the slider 216 can be the same as the material of the member 212. In an embodiment, the material of the slider 216 can be different than the material of the member 212.

The first end 236 of the slider 216 additionally includes a plurality of guides 250. The plurality of guides 250 can be configured to receive a fastener 252 such as, but not limited to, a screw, a bolt, or the like. The guides 250 can include a portion 254 for installation of the fastener 252. The fastener 252 can be secured to the third portion 222 of the member 212. The combination of the guides 250 and the fasteners 252 can provided for increased strength of the slider 216 when, for example, using a tool to provide an installation or an uninstallation force via the aperture 246 by transferring some of the force through the fasteners 252 to the member 212. Additionally, the slider 216 may be more securely fixed to the member 212 than with just a snap fit of the slider 216 in the guide 214.

Additional geometry of the slider 216 is discussed in additional detail in accordance with FIG. 6 below.

Figure 6:
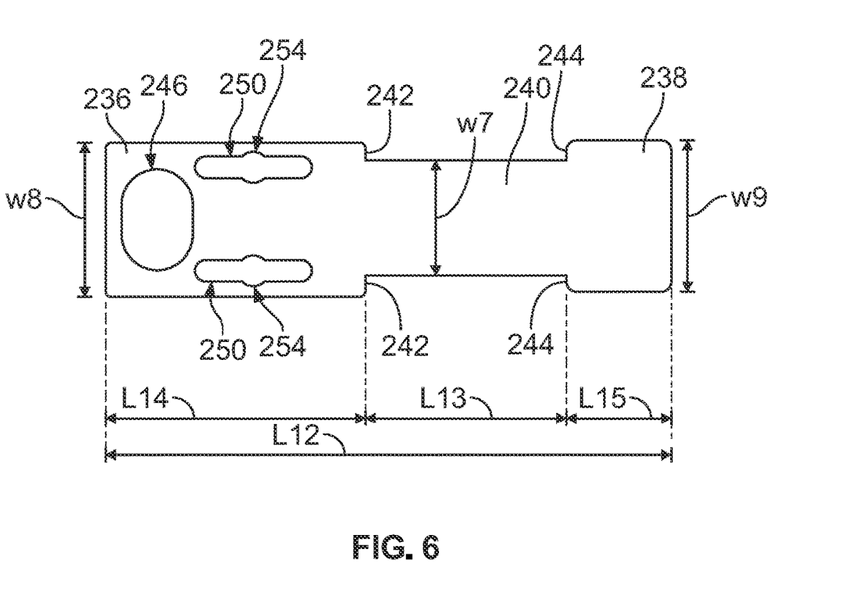
FIG. 6 shows the slider of the mounting bracket of FIG. 5, according to an embodiment.

FIG. 6 shows the slider 216 of the mounting bracket 210 of FIG. 5, according to an embodiment.

The slider 216 has a length L12. The length L12 can be broken into several component lengths L13, L14, and L15. The length L13 is the length of the middle portion 240. As such, the length L13 can also be equivalent to a length of travel of the slider 216. In the illustrated embodiment, the lengths L14 and L15 are different. In an embodiment, the lengths L14 and L15 can be the same. For example, if the first end 236 and the second end 238 of the slider 216 are symmetrical, the first end 236 and the second end 238 can result in the same lengths L14 and L15.

The slider 216 has a width W7 at the middle portion 240. The width W7 is selected so that the slider 216 is insertable into the guide 214. In an embodiment, the slider 216 can be inserted into the guide 214 in a snap fit connection and then slidable within the guide 214. It is to be appreciated that the slider 216 can be inserted into the guide 214 without being snap fit into the guide 214. In such an embodiment, the width W7 is smaller than a width of the guide 214. The first end 236 has a width W8 and the second end 238 has a width W9. In the illustrated embodiment, the width W8 and the width W9 are the same. It is to be appreciated that the widths W8 and W9 can be different in an embodiment. The widths W8 and W9 are larger than the width W7 so that the shoulder 242 and the shoulder 244 are created at the junction between the middle portion 240 and the first end 236 and the junction between the middle portion 240 and the second end 238.

Figure 7:
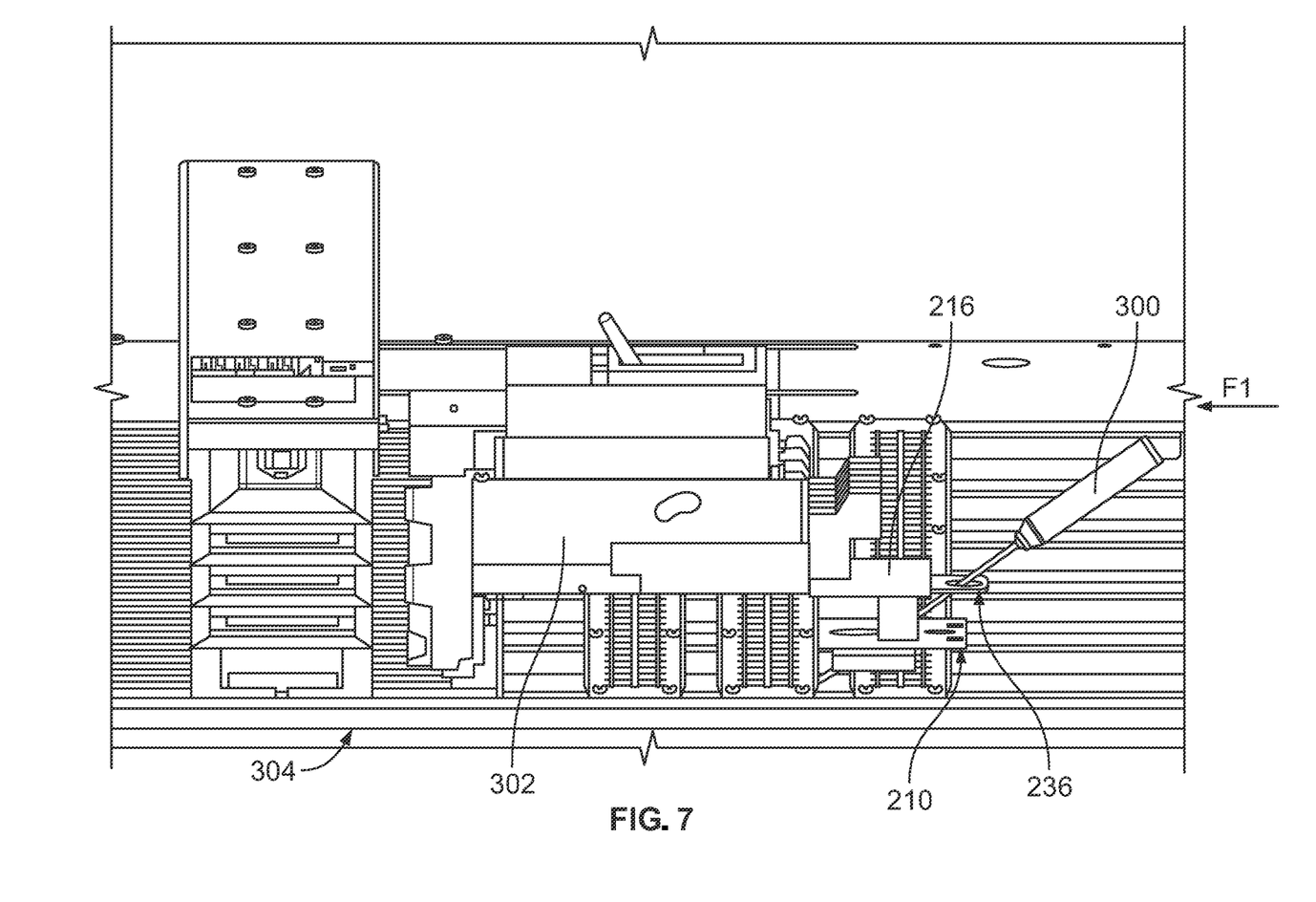
FIG. 7 shows the mounting bracket of FIG. 5 in an installation position, according to an embodiment.

FIG. 7 shows the mounting bracket 210 of FIG. 5 in an installation position, according to an embodiment. Reference is made to the mounting bracket 210 of FIG. 5. However, it is to be appreciated that the mounting bracket 10 (FIG. 1) and the mounting bracket 110 (FIG. 3) would function similarly as shown and described relative to FIG. 7. For purposes of this Specification, however, the description will not be repeated for the mounting bracket 10 (FIG. 1) and the mounting bracket 110 (FIG. 3).

In the illustrated embodiment, a tool 300 can be used to provide an installation force F1 and seat an electrical device 302 in a panelboard 304. In the illustrated embodiment, the tool 300 can be a screwdriver or the like. It is to be appreciated that the tool 300 can be any tool that is capable of being used to apply the installation force F1 to the mounting bracket 210. In the illustrated embodiment, the installation force F1 is horizontal from right-to-left with respect to the page. The slider 216 of the mounting bracket 210 is in a position in which the first end 236 and the shoulder 242 abut the member 212.

Figure 8:
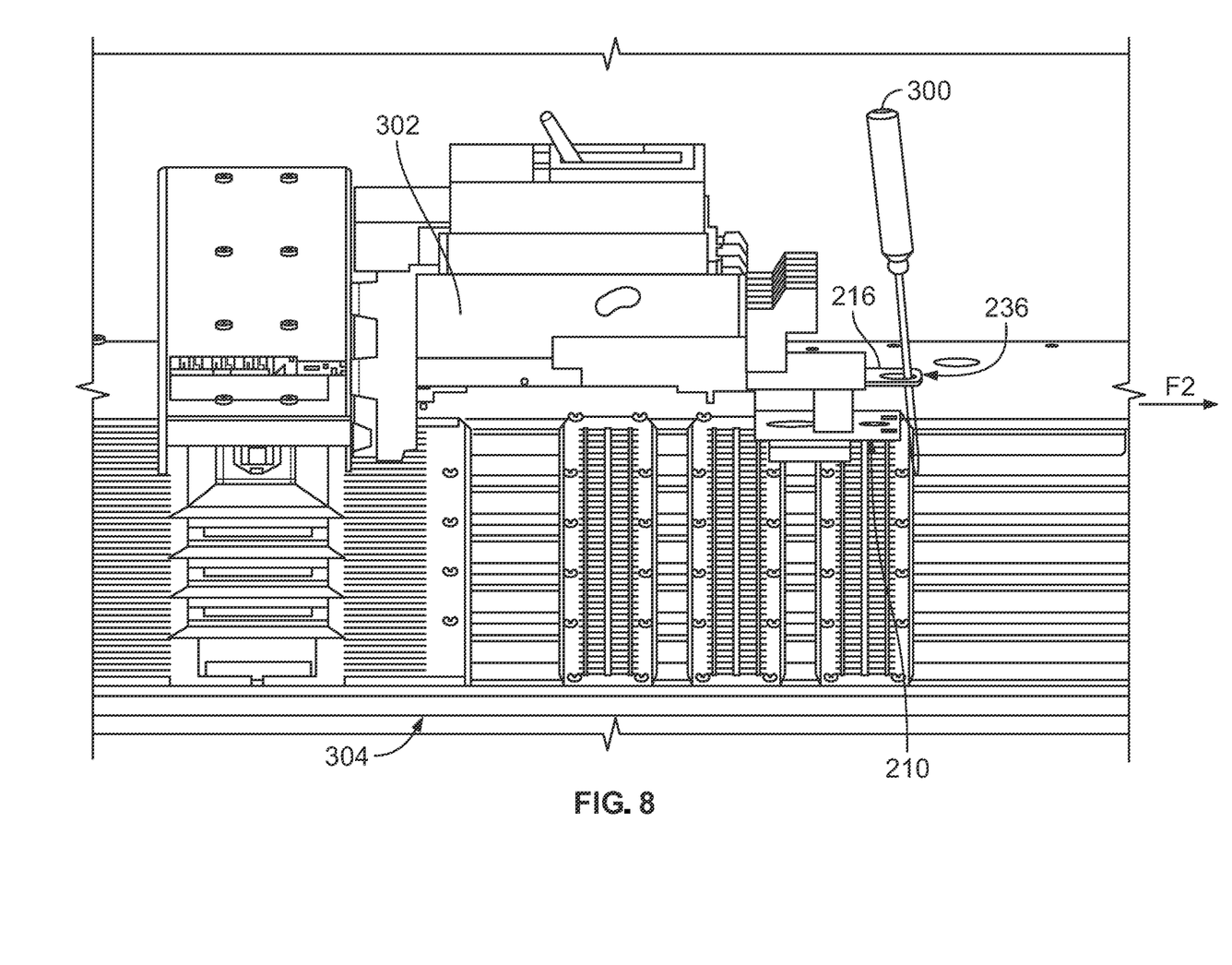
FIG. 8 shows the mounting bracket of FIG. 5 in an uninstallation position, according to an embodiment.

FIG. 8 shows the mounting bracket 210 of FIG. 5 in an uninstallation position, according to an embodiment. Reference is made to the mounting bracket 210 of FIG. 5. However, it is to be appreciated that the mounting bracket 10 (FIG. 1) and the mounting bracket 110 (FIG. 3) would function similarly as shown and described relative to FIG. 8. For purposes of this Specification, however, the description will not be repeated for the mounting bracket 10 (FIG. 1) and the mounting bracket 110 (FIG. 3).

In the illustrated embodiment, the tool 300 can be used to provide an uninstallation force F2 and unseat the electrical device 302 from the panelboard 304. In the illustrated embodiment, the uninstallation force F2 is horizontal from left-to-right with respect to the page. That is, the uninstallation force F2 is opposite the installation force F1 (FIG. 7). The slider 216 of the mounting bracket 210 is in a position in which the second end 238 and the shoulder 244 abut the member 212.

Aspects:

It is to be appreciated that any of aspects 1-11 can be combined with any of aspects 12-22, 23, or 24. It is to be appreciated that any of aspects 12-22 can be combined with any of aspects 23 or 24.

Aspect 1. An assembly, comprising: a mounting bracket comprising a member; a guide disposed in the member; and a slider, the slider configured to move between a first position and a second position relative to the member, the slider being configured to move within the guide, wherein the slider has a first end and a second end, the first end opposite the second end; wherein the first end includes a first portion and a second portion, the first portion configured to provide a contact for application of a force in a first direction and the second portion configured to provide a contact for application of a force in a second direction, wherein the second direction is opposite the first direction; wherein the slider has a first width between the first end and the second end; wherein the slider has a second width at the first end and the second end; and wherein the first width is smaller than the second width.

Aspect 2. The assembly of aspect 1, further comprising an aperture at the second end of the slider.

Aspect 3. The assembly of one of aspects 1 or 2, wherein the mounting bracket is made of plastic, metal, or any combination thereof.

Aspect 4. The assembly of one of aspects 1-3, wherein the member comprises a first portion and a second portion, the first portion including the guide and configured to receive an electrical device, the second portion including a rail connector.

Aspect 5. The assembly of aspect 4, wherein the first portion and the second portion are connected by a third portion.

Aspect 6. The assembly of aspect 5, wherein the third portion is perpendicular to the first portion and the third portion is perpendicular to the second portion.

Aspect 7. The assembly of one of aspects 4-6, wherein the first portion includes a planar surface and the second portion includes a planar surface, wherein the planar surface of the first portion is parallel to the planar surface of the second portion.

Aspect 8. The assembly of one of aspects 4-7, wherein the slider comprises a plurality of posts, the plurality of posts configured to contact a surface of the second portion and configured to support the slider on the surface of the second portion.

Aspect 9. The assembly of one of aspects 4-8, wherein the slider comprises a plurality of posts, and wherein the second portion comprises a plurality of openings, a portion of the plurality of posts extending through the plurality of openings, and wherein an end of the plurality of posts is larger than the plurality of openings.

Aspect 10. The assembly of aspect 9, wherein the plurality of posts are a plurality of fasteners configured to removably secure the slider to the member.

Aspect 12. The assembly of one of aspects 4-10, wherein the slider is removable.

Aspect 12. An assembly, comprising: a mounting bracket, comprising: a member; a guide disposed in the member; and a slider, the slider configured to move between a first position and a second position relative to the member, the slider being configured to move within the guide, wherein the slider comprises a first aperture at a first end of the slider; wherein the slider comprises a second aperture at a second end of the slider, the first end opposite the second end; wherein the slider has a first width between the first end and the second end; wherein the slider has a second width at the first end and the second end; and wherein the first width is smaller than the second width; and an electrical device secured to the mounting bracket.

Aspect 13. The assembly of aspect 12, further comprising an aperture at the second end of the slider.

Aspect 14. The assembly of one of aspects 12 or 13, wherein the electrical device is a one of a circuit breaker, a meter module, or a surge protector.

Aspect 15. The assembly of one of aspects 12-14, wherein the member comprises a first portion and a second portion, the first portion including the guide and configured to receive an electrical device, the second portion including a rail connector.

Aspect 16. The assembly of aspect 15, wherein the first portion and the second portion are connected by a third portion.

Aspect 17. The assembly of aspect 16, wherein the third portion is perpendicular to the first portion and the third portion is perpendicular to the second portion.

Aspect 18. The assembly of one of aspects 15-17, wherein the first portion includes a planar surface and the second portion includes a planar surface, wherein the planar surface of the first portion is parallel to the planar surface of the second portion.

Aspect 19. The assembly of one of aspects 15-18, wherein the slider comprises a plurality of posts, the plurality of posts configured to contact a surface of the second portion and configured to support the slider on the surface of the second portion.

Aspect 20. The assembly of one of aspects 15-19, wherein the slider is removable.

Aspect 21. The assembly of one of aspects 15-20, wherein the slider comprises a plurality of posts, and wherein the second portion comprises a plurality of openings, a portion of the plurality of posts extending through the plurality of openings, and wherein an end of the plurality of posts is larger than the plurality of openings.

Aspect 22. The assembly of aspect 21, wherein the plurality of posts are a plurality of fasteners configured to removably secure the slider to the member.

Aspect 23. A method, comprising: obtaining the assembly of one of aspects 1-21; asserting an installation force in a first direction such that the assembly is installed in a panelboard.

Aspect 24. The method of aspect 23, comprising: asserting an uninstallation force in a second direction, the second direction opposite the first direction, such that the assembly is uninstalled from the panelboard.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. An assembly, comprising:
   a mounting bracket, comprising:
      a member;
      a guide disposed in the member; and
      a slider, the slider configured to move between a first position and a second position relative to the member, the slider being configured to move within the guide,
      wherein the slider has a first end and a second end, the first end opposite the second end;
      wherein the first end includes a first part and a second part, the first part configured to provide a contact for application of a force in a first direction and the second part configured to provide a contact for application of a force in a second direction,
      wherein the second direction is opposite the first direction;
      wherein the slider has a first width between the first end and the second end;
      wherein the slider has a second width at the first end and the second end; and
      wherein the first width is smaller than the second width.

2. The assembly of claim 1, further comprising an aperture at the second end of the slider.

3. The assembly of claim 1, wherein the mounting bracket is made of plastic, metal, or any combination thereof.

4. The assembly of claim 1, wherein the member comprises a first portion and a second portion, the first portion including the guide and configured to receive an electrical device, the second portion including a rail connector.

5. The assembly of claim 4, wherein the first portion and the second portion are connected by a third portion.

6. The assembly of claim 5, wherein the third portion is perpendicular to the first portion and the third portion is perpendicular to the second portion.

7. The assembly of claim 4, wherein the first portion includes a planar surface and the second portion includes a planar surface, wherein the planar surface of the first portion is parallel to the planar surface of the second portion.

8. The assembly of claim 4, wherein the slider comprises a plurality of posts, the plurality of posts configured to contact a surface of the second portion and configured to support the slider on the surface of the second portion.

9. The assembly of claim 4, wherein the slider comprises a plurality of posts, and wherein the second portion comprises a plurality of openings, a portion of the plurality of posts extending through the plurality of openings, and
wherein an end of each of the plurality of posts is larger than a respective one of the plurality of openings.

10. The assembly of claim 9, wherein the plurality of posts are a plurality of fasteners configured to removably secure the slider to the member.

11. The assembly of claim 4, wherein the slider is removable.

12. An assembly, comprising:
a mounting bracket, comprising:
a member;
a guide disposed in the member; and
a slider, the slider configured to move between a first position and a second position relative to the member, the slider being configured to move within the guide,
wherein the slider comprises a first aperture at a first end of the slider;
wherein the slider comprises a second aperture at a second end of the slider, the first end opposite the second end;
wherein the slider has a first width between the first end and the second end;
wherein the slider has a second width at the first end and the second end; and
wherein the first width is smaller than the second width; and
an electrical device secured to the mounting bracket.

13. The assembly of claim 12, wherein the electrical device is a one of a circuit breaker, a meter module, or a surge protector.

14. The assembly of claim 12, wherein the member comprises a first portion and a second portion, the first portion including the guide and configured to receive the electrical device, the second portion including a rail connector.

15. The assembly of claim 14, wherein the first portion and the second portion are connected by a third portion.

16. The assembly of claim 15, wherein the third portion is perpendicular to the first portion and the third portion is perpendicular to the second portion.

17. The assembly of claim 14, wherein the first portion includes a planar surface and the second portion includes a planar surface, wherein the planar surface of the first portion is parallel to the planar surface of the second portion.

18. The assembly of claim 14, wherein the slider comprises a plurality of posts, the plurality of posts configured to contact a surface of the second portion and configured to support the slider on the surface of the second portion.

19. The assembly of claim 14, wherein the slider is removable.

\* \* \* \* \*